E. R. McCALL.
Cultivator-Teeth.
No. 226,531.  Patented April 13, 1880.
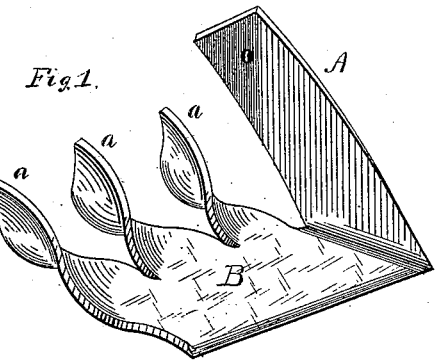
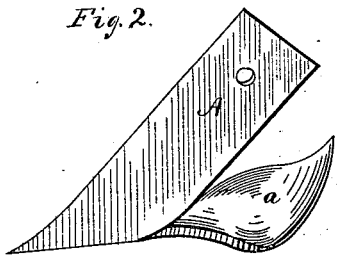
WITNESSES
Will R Omohundro
Lou T. Chadwick.
INVENTOR
Edwin R McCall
By Myra &c
ATTORNEYS.

UNITED STATES PATENT OFFICE.

EDWIN R. McCALL, OF LOCKPORT, NEW YORK.

CULTIVATOR-TOOTH.

SPECIFICATION forming part of Letters Patent No. 226,531, dated April 13, 1880.

Application filed October 20, 1879.

*To all whom it may concern:*

Be it known that I, EDWIN R. MCCALL, of Lockport, in the county of Niagara and State of New York, have invented certain new and useful Improvements in Cultivator-Teeth; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to an improvement in cultivator-teeth, whereby the intended purpose of such devices is more efficiently fulfilled; and it consists in the construction of a cultivator-tooth having one or more slightly-twisted prongs projecting from the rear of a flat cutting-blade, and in the peculiar construction and arrangement of its parts, as hereinafter more fully described.

In the accompanying drawings, in which similar letters of reference indicate like parts, Figure 1 represents a perspective view of my cultivator-tooth. Fig. 2 is an end view thereof.

My cultivator-tooth is preferably made of one piece of metal pressed into shape, having prongs slightly twisted projecting at any desired angle from the cutting-blade. These prongs may be struck or cut out from the same piece of metal as the standard and blade, or attached in any suitable way by ordinary mechanical expedient to the rear of the cutting-blade.

The tooth is constructed in such manner as to provide a colter-shaped standard, A, in connection with a horizontal cutting-blade, B, projecting at an angle obliquely to the rear, with prongs *a*, slightly twisted, attached to the rear of the blade to pulverize and give direction to the soil, and each tooth may be made of a single piece of steel struck out as aforesaid. These prongs project upward from the blade toward the surface of the soil and obliquely, the better to cut the roots, and in practice serve both to stir the soil and to uproot and lift the weeds to the surface.

The colter is bolted to the standard, and the tooth may be elevated or depressed by raising, lowering, or deflecting it by means of bolts uniting the standard and colter, and a more or less pitch or vertical position of the prongs thus obtained, as may be desirable in pulverizing the soil.

When employed for cutting and removing the weeds and cleaning the surface of the soil the prongs are depressed more nearly into a horizontal line, and the draft force thus decreased, and by changing the angle of the prongs the direction of the soil is varied as it passes over them, and I therefore construct them to either level or ridge the soil, as may be desired. I thus obtain an improved tooth which not only serves to thoroughly break and pulverize the soil, but affords a certain means of eradicating obnoxious weeds, &c.

What I claim is—

A cultivator-tooth having the colter A, by means of which the tooth is secured to the plow-standard, and obliquely-projecting cutter-blade B, with curved prongs *a a*, substantially as shown, and for the purpose described.

In testimony that I claim the foregoing as my own I affix my signature in presence of two witnesses.

EDWIN R. McCALL.

Witnesses:
LAFAYETTE BALCOM,
R. N. BURGESS.